Patented Sept. 28, 1948

2,450,086

UNITED STATES PATENT OFFICE 2,450,086

PREPARATION OF PHENOLPHTHALEIN β,β'-DIGLUCOSIDE

Ralph A. Hales, West Chester, Pa., assignor to Atlas Powder Company, Wilmington, Del., a corporation of Delaware No Drawing. Application July 23, 1946, Serial No. 685,769

5 Claims. (Cl. 260—210)

The present invention relates to the manufacture of phenolphthalein beta, beta'-diglucoside octaacetate.

An object of the invention is the production of phenolphthalein beta, beta'-diglucoside octaacetate in high yield.

Another object of the invention is the acceleration of the rate of condensation of phenolphthalein with tetraacetylglucosyl bromide.

Other objects will be apparent from the following description.

Phenolphthalein beta, beta'-diglucoside octaacetate has been prepared by coupling tetraacetylglucosyl bromide and phenolphthalein in the presence of silver oxide and quinoline as catalysts. The reaction may be represented by the following equation:

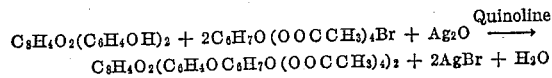
$$C_8H_4O_2(C_6H_4OH)_2 + 2C_6H_7O(OOCCH_3)_4Br + Ag_2O \xrightarrow{\text{Quinoline}}$$
$$C_8H_4O_2(C_6H_4OC_6H_7O(OOCCH_3)_4)_2 + 2AgBr + H_2O$$

This reaction, however, has been found to be erratic and unreliable in yield. Yields in different batches have often varied from as low as about 15% of theoretical to as high as about 50% of theoretical for no apparent reason.

It has now been determined that these erratic results in yields have been due to the quinoline used. Some samples of quinoline seem to be much more active than others in promoting the coupling reaction. The nature of the difference between active and less active quinoline is not known, nor is it known how the active quinoline may be distinguished from the less active quinoline except by using it in the reaction.

According to the present invention it has been discovered that quinoline may be promoted by the addition to the reaction of pyridine or methyl-substituted pyridines containing at least one alpha methyl group, and that when quinoline is promoted in this manner much more uniform results are obtained. Yields are usually improved over those obtainable when even the most active quinoline is employed alone, and fluctuations in yields due to variations in quinoline are substantially eliminated.

It has also been found that quinaldine, isoquinoline, or lepidine may be substituted for quinoline in the reaction, particularly when they are promoted in the same manner.

The preferred promoter materials are pyridine, alpha picoline, lutidine, and collidine. Alpha picoline is a particularly valuable promoter, for it has been found to be an active primary catalyst in its own right, and it may not only be added to quinoline as a promoter but also may entirely replace quinoline with good results.

In the performance of the reaction tetraacetylglucosyl bromide, phenolphthalein and the catalytic ingredients are mixed with a solvent for at least one of the reactants. Benzene, monochlorbenzene, and chloroform are examples of suitable solvents. After the reactants are brought together the reaction takes place spontaneously. Heating the reaction mixture speeds the reaction, but temperatures much above 50° C. usually tend to lower the yield. Temperatures of about 40° C. have been found desirable for practical operation of the process, but it is usually preferred that temperatures as high as this not be maintained much longer than about six hours. The completion of the reaction may usually be determined by the absence of soluble bromide in the reaction mixture.

The phenolphthalein beta, beta'-diglucoside octaacetate product may be recovered from the reacted mixture and purified in any convenient manner. One useful method includes filtering the insoluble material, chiefly silver bromide and unreacted silver oxide, from the reaction mixture, removing the solvent by vacuum distillation, digesting the product at elevated temperatures with ethyl alcohol, crystallizing by cooling and stirring, and finally filtering and drying.

Silver oxide operates not only as a catalyst but also as a reactant, since it is converted into silver bromide in the process. Silver carbonate may be substituted for silver oxide in the reaction, but loss in yield is sometimes noted when this substitution is made.

The amounts of reacting ingredients may be subject to considerable variation, but it is usually preferred that the silver catalyst be employed in slight excess. The reaction is generally assisted if enough solvent is used to keep the reaction mass in thinly fluid condition. The amount of organic catalyst (primary or quinoline type and the promoter type) is also subject to variation both as to total quantity and as to relative proportions. Usually the optimum amounts will vary somewhat with the particular materials employed. In general the total amount of organic catalyst ingredients will not exceed about 50% by weight of the tetraacetylglucosyl bromide employed.

The reaction time is usually shortened by increasing the amount of organic catalyst beyond the minimum amount necessary for maximum yield.

The invention will be further described by means of the following specific examples:

*Examples 1 through 12.—Activation of quinoline, isoquinoline, and quinaldine*

In each of the examples under this heading 9.7 grams of phenolphthalein, 15 grams of silver oxide, 30 cubic centimeters of benzene, and the organic catalyst were mixed at 25° C. and then a solution of 25 grams of crystalline tetraacetylglucosyl bromide in 30 cubic centimeters of benzene was added uniformly in a period of 10 minutes with stirring. The mixture was then agitated first at a temperature of 25° C. for one hour and then at a temperature of 40° C. until a negative test for soluble bromide was obtained, or if a negative test for soluble bromide was not obtained after some four to six hours at 40° C. the reaction was continued at 25° C. with stirring until it was completed, or for about sixteen hours more.

To recover and purify the phenolphthalein beta, beta'-diglucoside octaacetate, the insoluble material, chiefly silver bromide and excess silver oxide, was then removed by filtration, the filter cake was washed with benzene, and the solvent was essentially removed from the filtrate and wash liquor by vacuum distillation at 65° C. The residue was digested with 100 cubic centimeters of hot denatured ethyl alcohol, cooled, and then stirred for two days at 30° C. The resultant crystalline solid phenolphthalein beta, beta'-diglucoside octaacetate was then removed by filtration, washed with alcohol, again digested with 350 cubic centimeters of hot denatured ethyl alcohol, cooled, and stirred for two days at 30° C. The resulting crystalline material was filtered, washed with ethyl alcohol, and dried at 110° C. This same recovery and purification procedure was also used in the succeeding examples.

The quinoline employed in these examples could be classed as fairly inactive.

| Example | Primary Organic Catalyst | | Organic Promoter Catalyst | | Yield of Phenolphthalein beta, beta'-diglucoside octaacetate (Per Cent of Theory) | Time of Reaction, hours |
|---|---|---|---|---|---|---|
| | Kind | Amount, cc. | Kind | Amount, cc. | | |
| 1 | Quinoline | 3.7 | None | | 34.2 | Between 6.5 and 22.5. |
| 2 | do | 7.5 | do | | 41.3 | Between 7 and 23. |
| 3 | do | 3.7 | Pyridine | 0.12 | 50.2 | Not complete in 22.5. |
| 4 | do | 3.7 | do | 0.25 | 69.4 | Between 7 and 23. |
| 5 | do | 7.5 | do | 0.25 | 73.4 | 5.5. |
| 6 | do | 3.7 | do | 1.25 | 61.5 | 6. |
| 7 | do | 3.7 | Alpha picoline | 0.25 | 52.7 | Between 6.5 and 22.5. |
| 8 | do | 3.7 | 2,4 lutidine | 0.25 | 52.5 | Do. |
| 9 | Isoquinoline | 7.5 | None | | 48.2 | 3. |
| 10 | do | 7.5 | Pyridine | 0.50 | 51.6 | 4. |
| 11 | Quinaldine | 7.5 | None | | 49.4 | 5.5. |
| 12 | do | 7.5 | Pyridine | 0.50 | 60.9 | 3.5. |

*Examples 13 through 16.—Activation of quinoline when crude materials are employed*

In each of these examples the reaction was performed as described in Examples 1 through 12 except that the coupling reaction was performed entirely at 40° C.; the organic catalysts employed were crude commercial coal tar bases; and the tetraacetyl-glucosyl bromide was a less pure product, for which reason 30 grams were used. The quinoline used was again fairly inactive.

| Example | Amount of Quinoline, cc. | Organic Promoter Catalyst | | Yield of Phenolphthalein beta, beta'-diglucoside octaacetate (Per cent of Theory) | Time of Reaction, hours |
|---|---|---|---|---|---|
| | | Kind | Amount, cc. | | |
| 13 | 7.5 | None | | 38.0 | 5.5 |
| 14 | 6.0 | Crude lutidine | 1.5 | 49.9 | 4 |
| 15 | 6.0 | Crude collidine | 1.5 | 45.8 | 4 |
| 16 | 6.0 | Crude alpha picoline | 1.5 | 55.9 | 3.5 |

*Examples 17 and 18.—Activation of lepidine*

To tetraacetylglucosyl bromide dissolved in 55 cc. of benzol, lepidine and the activator employed were added and to this solution were added 12 grams of silver oxide and 9.7 grams of phenolphthalein. During mixing of the reactants the temperature was maintained at 25° C., and after the completion of the mixing the temperature was raised to 40° C. and maintained at this value until coupling was completed. In the case of Example 17 three grams of additional silver oxide were added to the reaction after it had been conducted for 3½ hours at 40° C.

| Example | Amount of Lepidine, cc. | Amount of Crude Alpha Picoline, cc. | Yield of Phenolphthalein beta beta'-diglucoside octaacetate (per cent of Theory) | Time of Reaction, hours |
|---|---|---|---|---|
| 17 | 7.5 | | 30.7 | 6 |
| 18 | 6.0 | 1.5 | 61.0 | 2 |

*Example 19.—Substitution of silver carbonate for silver oxide*

This example was performed in the same manner as Example 18 except that 6 cubic centimeters of quinoline were employed in place of the lepidine, 14.3 grams of silver carbonate were employed in place of the 12 grams of silver oxide, and after 3½ hours at 40° C. an additional 7.15 grams of silver carbonate were added to the reaction mixture. The reaction was incomplete after 23 hours, but a yield of 42.2% of the theoretical yield of phenolphthalein beta, beta'-diglucoside octaacetate was obtained.

*Example 20.—Alpha picoline as a single organic catalyst*

The reaction for this example was performed in the manner described for Examples 1 through 12 except that the tetraacetylglucosyl bromide was of an impure variety. The organic catalyst used was 7.5 cubic centimeters of alpha picoline. The reaction was completed in two hours and a yield of 37.4% of theoretical was obtained. This compares with a reaction time of 3.5 hours and a yield of 38.4% when a sample of active quinoline was used as the organic catalyst.

What is claimed is:

1. In a process for the preparation of phenolphthalein beta, beta'-diglucoside octaacetate by the reaction of phenolphthalein and tetraacetylglucosyl bromide in a solvent, the improvement which comprises performing the reaction in the presence of a catalyst selected from the class consisting of silver oxide and silver carbonate, and another catalyst comprising a substance selected from the group consisting of quinoline, isoquinoline, quinaldine, and lepidine, said other catalyst further including an added substance selected from the group consisting of pyridine, alpha picoline, lutidine, and collidine.

2. In a process for the preparation of phenolphthalein beta, beta'-diglucoside octaacetate by the reaction of phenolphthalein and tetraacetylglucosyl bromide in a solvent, the improvement which comprises performing the reaction in the presence of catalytic ingredients comprising silver oxide, quinoline, and an added substance selected from the group consisting of pyridine, alpha picoline, lutidine, and collidine.

3. In a process for the preparation of phenolphthalein beta, beta'-diglucoside octaacetate by the reaction of phenolphthalein and tetraacetylglucosyl bromide in a solvent, the improvement which comprises performing the reaction in the presence of silver oxide, quinoline, and alpha picoline.

4. In a process for the preparation of phenolphthalein beta, beta'-diglucoside octaacetate by the reaction of phenolphthalein and tetraacetylglucosyl bromide in a solvent, the improvement which comprises performing the reaction in the presence of silver oxide, quinoline, and lutidine.

5. In a process for the preparation of phenolphthalein beta, beta'-diglucoside octaacetate by the reaction of phenolphthalein and tetraacetylglucosyl bromide in a solvent, the improvement which comprises performing the reaction in the presence of silver oxide and alpha picoline.

RALPH A. HALES.

REFERENCES CITED

The following references are of record in the file of this patent:

UNITED STATES PATENTS

| Number | Name | Date |
|---|---|---|
| 2,216,734 | Cairncross | Oct. 8, 1940 |